L. BROWN.
Sulky-Plow.
No. 211,696.  Patented Jan. 28, 1879.
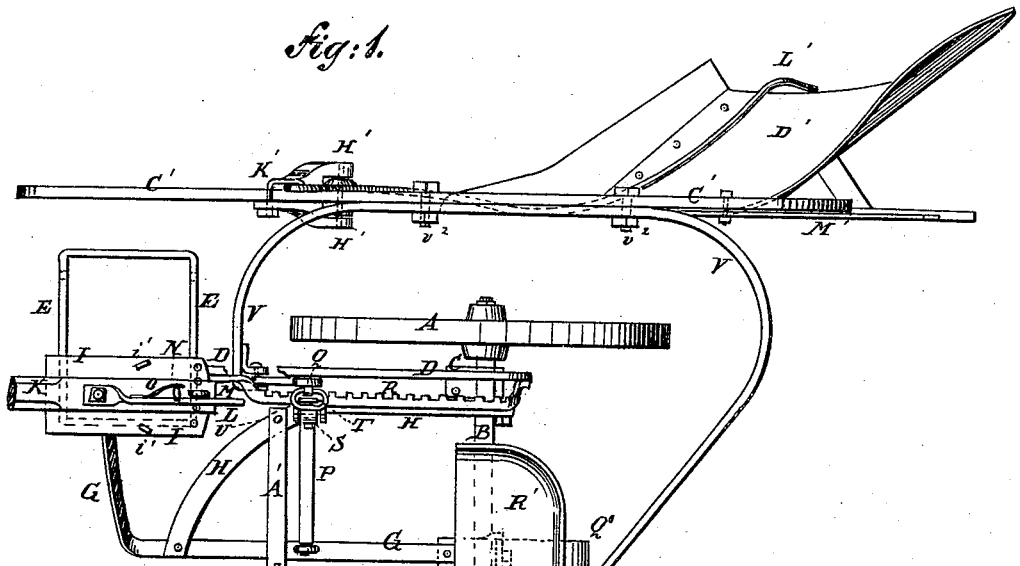
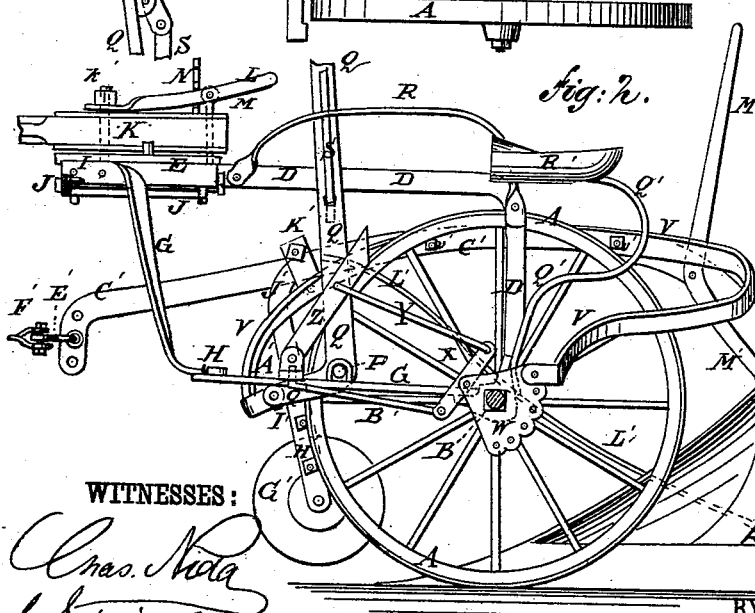
WITNESSES:
Chas. Nida
C. Sedgwick
INVENTOR:
L. Brown
BY Munn & Co
ATTORNEYS.

UNITED STATES PATENT OFFICE.

LEROY BROWN, OF WAITSBURG, WASHINGTON TERRITORY.

IMPROVEMENT IN SULKY-PLOWS.

Specification forming part of Letters Patent No. 211,696, dated January 28, 1879; application filed June 13, 1878.

*To all whom it may concern:*

Be it known that I, LEROY BROWN, of Waitsburg, in the county of Walla Walla, Washington Territory, have invented a new and useful Improvement in Sulky-Plows, of which the following is a specification:

Figure 1 is a top view of my improved machine. Fig. 2 is a side view of the same, the left-hand wheel being removed. Fig. 3 is a detail view of the upper part of the lever.

The invention is an improvement in sulky-plows.

A are the wheels, which revolve upon the journals of the axle B. To the axle B, near the right-hand wheel A, is secured a casting, C, to which is attached the end of a bar, D. The bar D projects upward, is bent forward at right angles, and its forward end is made with an offset, to pass around the rear inner corner of the frame E, to which it is securely attached. To the middle part of the axle B is attached a casting, F, to which is secured the inner end of a bar, G, which projects forward and is curved upward and outward, and its end is attached to the end of the frame E, to support the said frame securely in place. The bar G is strengthened in position by the bar H, the rear end of which is attached to the casting C, and its forward part is curved inward and is attached to the bar G, near its bend. Upon the frame E is placed a plate, I, which has lugs formed upon or attached to its lower side to receive the bolt J, which passes through them and through the side bars of the frame E, to secure the said plate I securely to the said frame. Several holes are formed in the side bars of the frame E to receive the bolt J, so that the position of the plate I may be adjusted according as two or more horses are to be used.

K is the tongue, which is secured to the forward part of the plate I by a bolt, $k'$, which bolt also secures the forward end of the lever L.

To the rear part of the lever L is hinged a pin, M, which passes down through a hole in the rear end of the tongue K and through a hole in the rear end of the plate I. Several holes are formed in the rear part of the plate I to receive the pin M, so that the tongue K may be adjusted to cause the plow to take or leave land, as may be required.

The lever L moves up and down along the side of an upright bar, N, attached to the rear part of the plate I, and which has notches formed in it to receive the lever L and hold it in place, both when the pin is lowered into the plate I and when it is raised out of said plate.

The lever L is held in the notches of the bar N by a spring, O, attached to it, and which rests against the outer side of the said bar N. The plate I is provided with stops $i'$ to limit the movement of the tongue K upon its bolt.

Having thus described the parts to which my invention relates, I will now describe other parts which make up the complete operative machine.

To the bars G H is pivoted a shaft, P, to the outer end of which is rigidly attached the angle of a bent lever, Q, the long arm of which projects upward, moves along the inner side of the bar D, and is kept in position against the said bar by a curved plate, R, the ends of which are attached to the said bar D. The inner edge of the bar R is notched to receive the bar S, which slides along the inner side of the lever Q, and the lower end of which is inclined outward and downward, and passes through a hole in the said lever Q.

The upper end of the sliding bar S is pivoted to the short arm of a short bent lever, T, which is pivoted at its angle to lugs formed upon or attached to the lever Q, so that by moving the upper end of the lever T outward the sliding bar S will be drawn upward, which movement forces it into a notch of the bar R, and thus holds the lever Q securely in any position into which it may be adjusted.

To the upper end of the lever Q is pivoted a ring or link, U, in such a position that it may be passed over the upper end of the lever T, to hold it securely in place when locking the lever Q.

To the end of the short arm of the lever Q is hinged the end of a bar, V, which passes outward, is curved to the rearward, passes back parallel with the right-hand wheel A, is curved inward and forward to pass around the rear side of the said wheel, and its other end is hinged to a casting, W, attached to the axle B near the left-hand wheel A. Several holes are formed in the rear part of the casting W, to receive the pin $v^1$, that hinges the end of the bar V to the said casting, so that the end of the bar V may be adjusted higher or lower to adjust the plowshare to run level in all circumstances.

By this construction, by adjusting the lever Q, the plow may be caused to run deeper or shallower in the ground or out of the ground, as may be required; and by adjusting the tongue K the plow may be adjusted to cut a wide or a narrow furrow, as may be desired.

To the forward part of the casting W is pivoted a lever, X, to the upper end of which is pivoted the end of a rod, Y, the other end of which is pivoted to a foot-lever, Z. The end of the foot-lever Z is pivoted to the brake-bar A'.

To the lower end of the lever X is pivoted a rod, B', the other end of which is pivoted to the brake-bar A'. The brake-bar A' rests upon the bar G, and its end is pivoted to the bar H. The other end of the brake-bar A' projects across the face of the left-hand wheel A.

By this construction, by pressing the free end of the foot-lever Z forward, the brake-bar A' will be drawn back against the face of the wheel A, and by moving the free end of the foot-lever Z rearward the brake-bar A' will be pushed away from the face of the wheel A, so that by applying the brake A' to the wheel A the plow may be caused to move inward or toward the land, the said left-hand wheel being checked, while the right-hand wheel is free to advance.

To the straight part of the curved bar V at the side of the right-hand wheel A is secured, by two bolts, $v^2$, the plow-beam C'. The plow is made with a detachable mold-board, D', so that it may be changed according as the kind of plowing to be done may require.

E' is a short horizontal bar, upon the rear edge of which are formed two lugs to receive the end of the plow-beam C', to which it is secured by a pin. The forward end of the plow-beam is bent downward, and has a number of holes formed in it to receive the pivoting-pin of the bar E', so that the said bar may be adjusted higher or lower, to cause the plow to work deeper or shallower in the ground, as may be desired.

In the horizontal bar E' are formed a number of holes to receive the bolt of the clevis F', so that the said clevis may be adjusted to cause the plow to take or leave land, as may be required. The arms of the clevis F' are twisted to bring its bend into proper position to receive the clevis of the double-tree.

G' is a rotary cutter, the journals of which revolve in bearings in the lower ends of the wooden blocks H', which are bolted to the arms of the fork I'. The shank of the fork I' is swiveled to a standard, J', the upper end of which is curved to the rearward and is secured to the plow-beam C' by a clamp, K'.

L' is a rod, the rear part of which is bent outward and rearward, so as to pass across the face of the mold-board D' to bend down the weeds and turn them into the furrow, so that they may be covered by the furrow-slice as it is turned. The forward end of the hook-rod L' passes along the side of the plow-beam C', and is secured to said plow-beam by the clamp K', that secures the standard J' of the rotary cutter G'.

To the rear part of the plow-beam C' is pivoted a bent bar, M', in such a position that by turning it upon its pivot it may push stubble, weeds, grass-stalks, and other rubbish out of the throat of the plow to prevent said plow from becoming clogged.

To the rear side of the casting F is attached the lower end of the standard Q', to the upper end of which is secured the driver's seat R'. The standard Q' is secured to the casting F in such a way that it may be adjusted vertical to the axle B or at an inclination toward either of the wheels A, as the surface of the ground being plowed may require, so that the driver's seat may be level and his weight may bear in proper direction upon the sulky and plow.

Having thus described my invention, I claim as new and desire to secure by Letters Patent—

The plate I, bolted adjustably to the frame E, in combination with the tongue K, the lever L, and the hinged pin M, as and for the purpose described.

LEROY BROWN.

Witnesses:
O. P. LACY,
THOS. J. HOLLOWELL.